US 6,735,050 B2

(12) United States Patent
Takagi et al.

(10) Patent No.: US 6,735,050 B2
(45) Date of Patent: May 11, 2004

(54) SUSPENSION WITH COVER PORTION COMPRISING PART OF FLEXURE FOR DISC DRIVE

(75) Inventors: Yasuji Takagi, Ebina (JP); Masao Hanya, Yokohama (JP); Osamu Iriuchijima, Yokohama (JP); Tetsuya Fujiwara, Yokohama (JP); Ryozo Oomoto, Aiko-gun (JP)

(73) Assignee: NHK Spring Co., Ltd., Yokohama (JP)

( * ) Notice: Subject to any disclaimer, the term of this patent is extended or adjusted under 35 U.S.C. 154(b) by 129 days.

(21) Appl. No.: 09/813,587

(22) Filed: Mar. 21, 2001

(65) Prior Publication Data

US 2002/0051319 A1 May 2, 2002

(30) Foreign Application Priority Data

Oct. 30, 2000 (JP) ........................................ 2000-331124

(51) Int. Cl.[7] .............................. G11B 21/16; G11B 5/48
(52) U.S. Cl. ................... 360/244.9; 360/244.8
(58) Field of Search .................. 360/244.8, 245.3, 360/245, 244.9, 244.2, 240

(56) References Cited

U.S. PATENT DOCUMENTS

| 4,208,684 | A | | 6/1980 | Janssen et al. .......... 360/244.8 |
| 4,991,045 | A | | 2/1991 | Oberg ..................... 360/244.3 |
| 5,748,409 | A | * | 5/1998 | Girard et al. .............. 360/245 |
| 5,936,803 | A | | 8/1999 | Berding .................... 360/244.8 |
| 6,212,044 | B1 | | 4/2001 | Murakami et al. ........ 360/244.9 |
| 6,297,933 | B1 | * | 10/2001 | Khan et al. ............... 360/244.2 |
| 6,307,715 | B1 | | 10/2001 | Berding et al. .......... 360/244.8 |
| 6,392,843 | B1 | * | 5/2002 | Murphy .................... 360/245.3 |
| 6,504,684 | B1 | * | 1/2003 | Danielson et al. ........ 360/244.8 |
| 2001/0008475 | A1 | | 7/2001 | Takagi et al. ............. 360/244.8 |
| 2001/0048574 | A1 | * | 12/2001 | Bhattacharya et al. ... 360/244.2 |

FOREIGN PATENT DOCUMENTS

| JP | 60-127578 | 7/1985 |
| JP | 07-130025 | 5/1995 |

OTHER PUBLICATIONS

M. Hanya et al, "Suspension Design for Windage and High Bandwidth", (Treatise), Presented on Mar. 27, 2000, Japan.

* cited by examiner

Primary Examiner—Julie Anne Watko
(74) Attorney, Agent, or Firm—Frishauf, Holtz, Goodman & Chick, P.C.

(57) ABSTRACT

In a suspension comprising a base portion, beam portion, and a hinge member connecting the base portion and the beam portion to each other, a hole for lowering the stiffness of a region of the beam portion near the hinge member is formed in that region. A cover portion closes the opening of the hole.

4 Claims, 3 Drawing Sheets

SUSPENSION WITH COVER PORTION COMPRISING PART OF FLEXURE FOR DISC DRIVE

CROSS-REFERENCE TO RELATED APPLICATIONS

This application is based upon and claims the benefit of priority from the prior Japanese Patent Application No. 2000-331124, filed Oct. 30, 2000, the entire contents of which are incorporated herein by reference.

BACKGROUND OF THE INVENTION

The present invention relates to a suspension for disc drive incorporated in an information processing apparatus, such as a personal computer.

A hard disc drive (HDD) for recording in and reading information from a rotating magnetic disc or magneto-optical disc includes a carriage that can turn around a shaft. The carriage is rotated around the shaft by means of a positioning motor. The carriage is provided with an arm (actuator arm), a suspension mounted on the distal end portion of the arm, a head portion including a slider mounted on the suspension, etc. When the disc rotates at high speed, the slider slightly lifts off the disc surface, whereupon an air bearing is formed between the disc and the slider. The suspension comprises a base portion including a base plate, a beam portion formed of a precision plate spring, a flexure fixed to the beam portion by laser welding or the like, etc. The base plate is fixed to a suspension mounting surface of the arm.

With the advance of compaction of information recorded in the disc and speed-up of the disc drive operation, the disc drive of this type has been required a shorter seek time. In order to shorten the seek time, the disc rotation must be speeded up.

In order to improve the required properties of the suspension, the inventor hereof has proposed a novel suspension in which a base portion and a beam portion are connected by means of a hinge member. According to this prior art, the base portion, beam portion, and hinge member are separate components, so that materials and plate thicknesses corresponding to their respective required properties can be selected individually.

According to a proposal, for example, the spring constant of the hinge member is lowered by making the hinge member thinner than the beam portion. In this case, however, the stiffness of a region of the beam portion near the hinge member is much higher than that of the hinge member. If the disc drive is shocked, therefore, it cannot effectively absorb the shock, so that the slider is brought too heavily into contact with the disc surface. Thus, the shock resistance is a critical problem. In order to enhance the shock resistance, therefore, a proposal is made to form a through hole in the region of the beam portion near the hinge member, thereby lowering the stiffness of that region.

If the through hole is formed in the region of the beam portion near the hinge member, however, the beam portion is caused to flutter by the influence (windage or air turbulence) of air over the disc surface upon the through hole, especially in the case of a disc drive in which the disc rotates at high speed.

BRIEF SUMMARY OF THE INVENTION

Accordingly, the object of the present invention is to provide a suspension that enjoys high shock resistance and is not liable to flutter.

In order to achieve the above object, a suspension in a first aspect of the present invention comprises a base portion, a beam portion with a flexure, a hinge member connecting the base portion and the beam portion to each other, a hole in the beam portion, and a cover portion covering the opening of the hole. According to this invention, there may be provided a suspension that enjoys high shock resistance, and in which the beam portion is light in weight and the incidence of flutter can be restrained.

In order to achieve the above object, a suspension in a second aspect of the invention comprises a base portion, a beam portion with a flexure, a hinge member connecting the base portion and the beam portion to each other, a hole formed in a region of the beam portion near the hinge member so that the stiffness of the region near the hinge member is lowered, and a cover portion covering the opening of the hole. According to this invention, there may be provided a suspension that enjoys higher shock resistance, and in which the beam portion is light in weight and the incidence of flutter can be restrained.

The hinge member is lower in bending stiffness than the base portion and the beam portion. When a bending load is applied to the beam portion, therefore, the hinge member bends, thereby displaying a given spring characteristic. The "hole formed near the hinge member" described herein is a hole that is formed in a position nearer to the hinge member than a point halfway between the proximal end (end near the hinge member) of the beam portion and the slider is. Preferably, the hole should be formed so that the center of gravity of the combination of the beam portion and the hinge member is situated nearer to the slider than the hole is.

In each of the suspensions in the first and second aspects, the cover portion may be composed of an unetched portion of the hole of the beam portion formed by partial etching. According to this invention, the cover portion can be constructed using a part of the beam portion, so that the number of components never increases. Besides, the cover portion can be easily formed by utilizing partial etching.

Alternatively, the cover portion may be composed of an extension formed by extending a part of the hinge member toward the beam portion. According to this invention, the cover portion can be constructed using a part of the hinge member, so that the number of components never increases. The cover portion may be composed of a laminar member attached to the beam portion. According to this invention, the cover portion can be easily constructed by attaching a laminar member, such as a tape or foil, to the beam portion.

Furthermore, the cover portion may be composed of a part of the flexure. According to this invention, the cover portion can be constructed using a part of the flexure that is thinner than the hinge member, so that the number of components never increases. The influence of air turbulence can be restrained by closing the opening of the hole by means of the cover portion.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
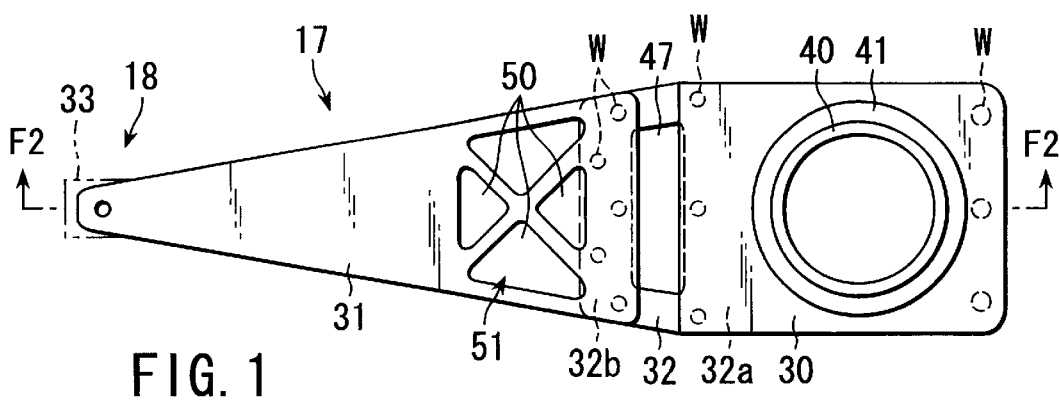
FIG. 1 is a plan view of a suspension for disc drive according to a first embodiment of the present invention.

A first embodiment of the present invention will now be described with reference to FIGS. 1 to 3. A hard disc drive (HDD) 10 shown in FIG. 3 includes a carriage 12 that can turn around a shaft 11. The carriage 12 is rotated around the shaft 11 by means of a positioning motor 13 such as a voice coil motor. The carriage 12 is provided with arms (actuator arms) 16, suspensions 17 mounted individually on the respective distal end portions of the arms 16, head portions 18 on the respective distal end portions of the suspensions 17, etc. As the carriage 12 is driven by means of the motor 13, the head portion 18 moves to a desired track of a disc 19.

The head portion 18 includes a slider 20 situated in a position such that it can face a recording surface of the disc 19, a transducer (not shown) held on the slider 20, etc. When the disc 19 rotates at high speed, air that gets into the space between the disc 19 and the slider 20 slightly lifts the slider 20 off the disc 19 and forms an air bearing between the disc 19 and the slider 20.

Figure 2:
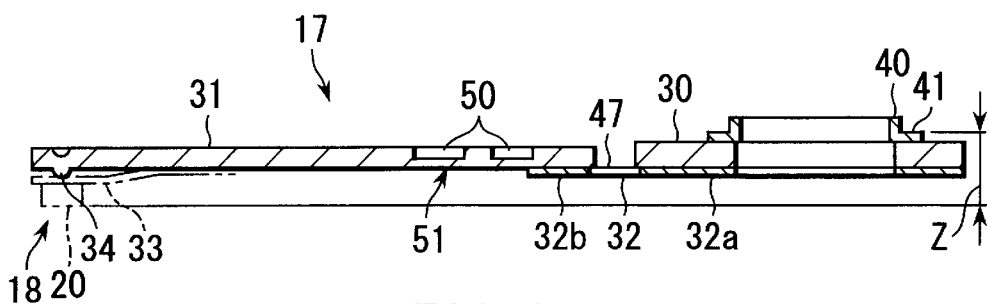
FIG. 2 is a sectional view of the suspension taken along line F2—F2 of FIG. 1.
Figure 3:
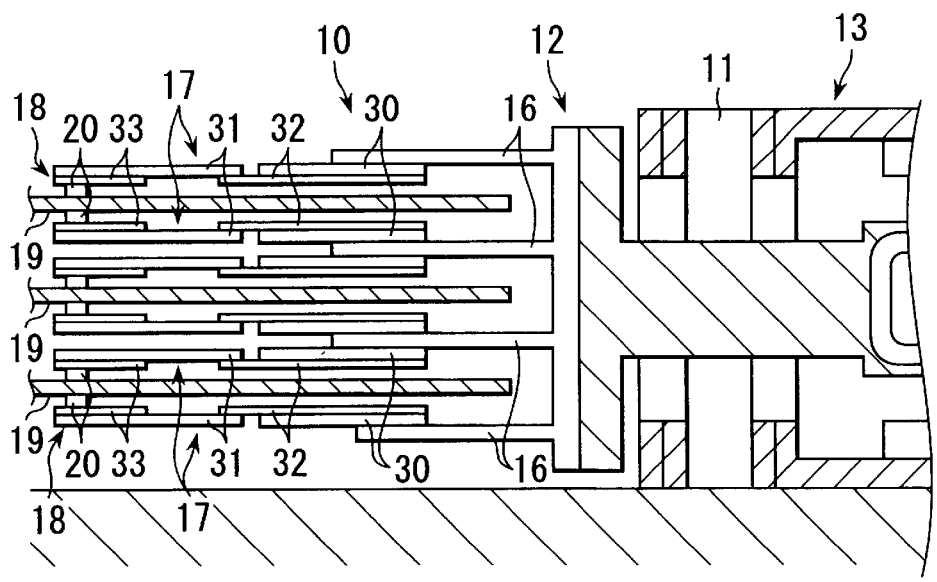
FIG. 3 is a sectional view of a part of a hard disc drive with the suspension shown in FIG. 1.

As shown in FIGS. 1 and 2, each suspension 17 comprises a base portion 30, a beam portion 31, a hinge member 32 connecting the base portion 30 and the beam portion 31, a flexure 33 on the beam portion 31, etc. The distal end portion of the beam portion 31 is formed having a convex dimple 34 that abuts the flexure 33. The head portion 18 is attached to the flexure 33. A base plate 41 having a boss portion 40 is fixed to the base portion 30. As shown in FIG. 3, each base portion 30 is fixed to its corresponding actuator arm 16.

The base portion 30 and the beam portion 31 are formed of the same material (e.g., stainless steel). In order to reconcile lighter weight with higher stiffness, they may be formed of a light alloy, such as aluminum or titanium alloy, or a composite material based on these alloys, which ensures further improved frequency characteristics and vibration characteristics.

The hinge member 32 is a plate spring member, e.g., a rolled stainless-steel plate, which is thinner than the base portion 30 and the beam portion 31. An aperture 47 is formed in the central portion of the hinge member 32 with respect to its width direction. One portion 32a of the hinge member 32 is fixed to an end portion of the base portion 30 by laser welding or the like. The other portion 32b of the hinge member 32 is fixed to an end portion of the beam portion 31 by laser welding or the like. In FIG. 1, symbol W designates an example of a weld. The laser welding may be replaced with an adhesive agent or any other suitable fixing means.

The flexure 33 that is fixed to the beam portion 31 is formed of a plate spring (e.g., rolled stainless steel) that is thinner than the beam portion 31 and the hinge member 32, and is fixed in a given position on the beam portion 31 by laser welding or the like. The flexure 33 is fitted with the slider 20 that constitutes the head portion 18.

The hinge member 32 of this embodiment is composed of a component separated from the base portion 30 and the beam portion 31. Therefore, a spring material and a thickness that meet required properties of the hinge member 32 can be adopted without regard to the base portion 30 and the beam portion 31. Thus, properties (e.g., high stiffness) that are required of the base portion 30 and the beam portion 31 can be easily reconciled with the properties (e.g., low spring constant) that are required of the hinge member 32. For example, the beam portion 31, base portion 30, hinge member 32, and flexure 33 have thicknesses of about 100 $\mu$m, 200 $\mu$m, 40 $\mu$m, and 20 $\mu$m, respectively.

The beam portion 31 of this embodiment is formed having holes 50 near the hinge member 32. The holes 50 are formed by removing a part of the beam portion 31 by partial etching. They serve to lower the stiffness of a region of the beam portion 31 near the hinge member 32, thereby enhancing the shock resistance.

A cover portion 51 closes the respective openings of the holes 50 at least on one side of the beam portion 31. The cover portion 51 of this embodiment is composed of that part (e.g., about 20 $\mu$m thick) of the beam portion 31 which remains without being etched when the holes 50 are formed by partial etching. Since the cover portion 51 closes the holes 50 in this manner, the region of the beam portion 31 near the hinge member 32 can be restrained from being influenced by air turbulence if the disc rotates at high speed, and the incidence of flutter can be lowered to a practically negligible level.

Figure 4:
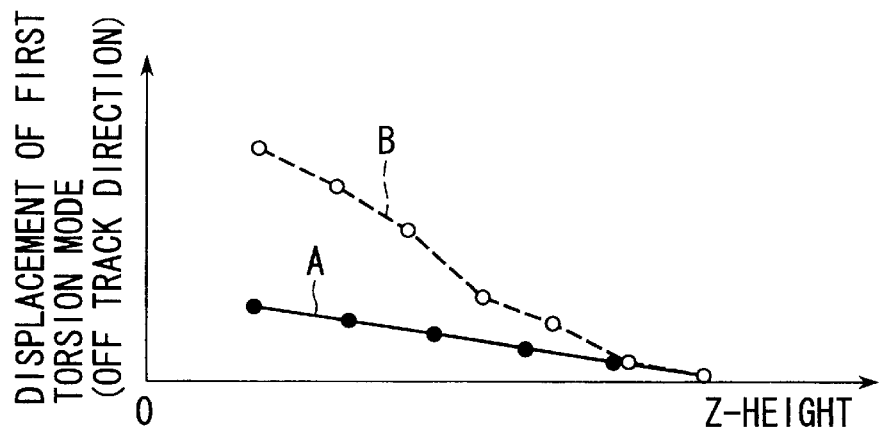
FIG. 4 is a diagram comparatively showing the incidences of flutter for the cases of suspensions that are provided with a cover portion and not, individually.

In FIG. 4, segment A indicates the result of analysis of the incidence of flutter of the suspension 17 in which the cover portion 51 closes the respective openings of the holes 50. Segment B indicates the result of analysis of the incidence of flutter of a comparative example in which the openings of the holes 50 are not closed by any cover portion. In FIG. 4, the axis of ordinate (displacement) represents the level of flutter, while the axis of abscissa represents a dimension Z (so-called Z-height) from the lower surface of the slider 20 of FIG. 2 to the mounting surface of the base plate 41. As shown in FIG. 4, it is confirmed that the incidence of flutter of the suspension 17 that uses the cover portion 51 is much lower than that of the suspension that uses no cover portion.

Figure 5:
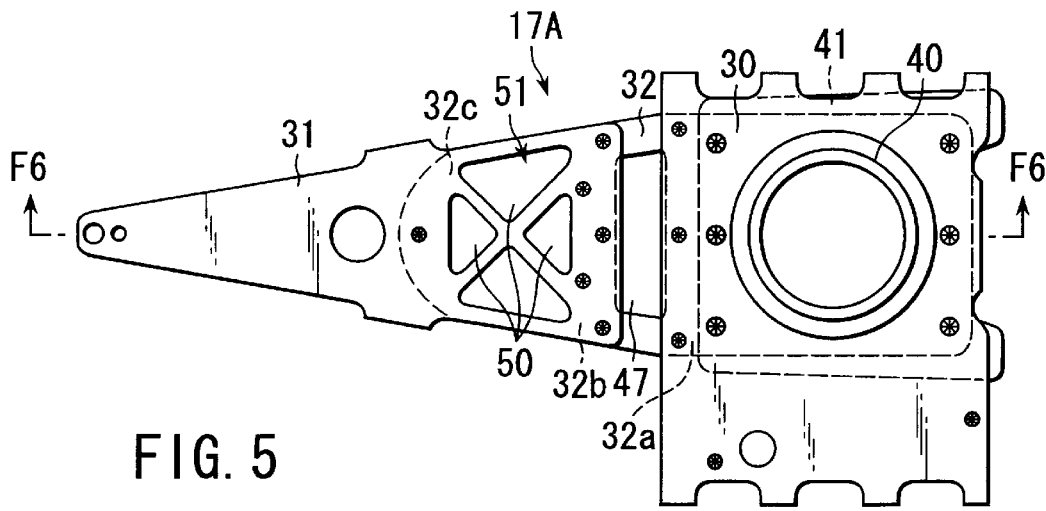
FIG. 5 is a plan view of a suspension according to a second embodiment of the invention.
Figure 6:
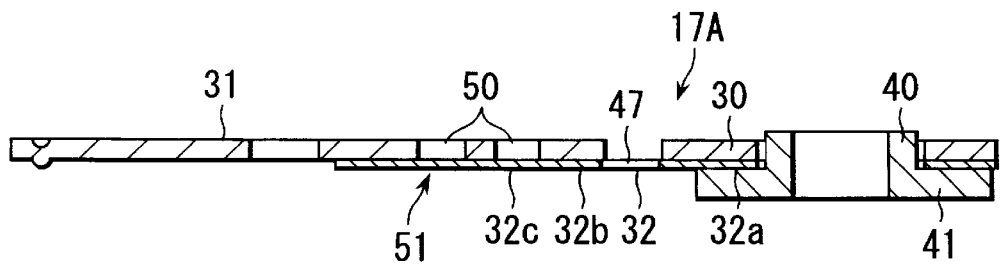
FIG. 6 is a sectional view taken along line F6—F6 of FIG. 5.

FIGS. 5 and 6 show a suspension 17A according to a second embodiment of the present invention. In the suspension 17A, a part of a hinge member 32 extends toward a beam portion 31, thereby forming an extension 32c, which constitutes a cover portion 51 that closes the respective openings of holes 50. The suspension 17A of the second embodiment has other basic configurations, functions, and effects in common with the suspension 17 of the first embodiment. Therefore, like reference numerals are used to designate common portions of the two embodiments, and a description of those portions is omitted.

Figure 7:
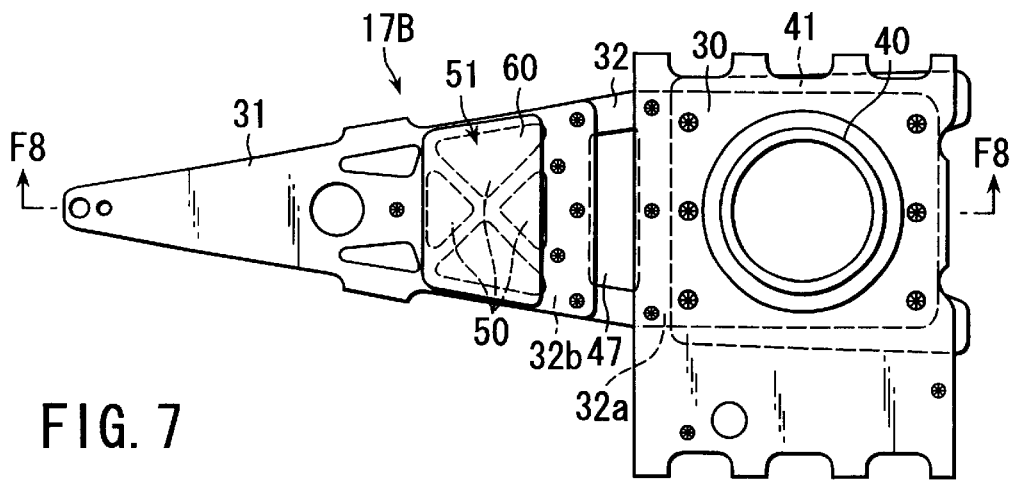
FIG. 7 is a plan view of a suspension according to a third embodiment of the invention.
Figure 8:
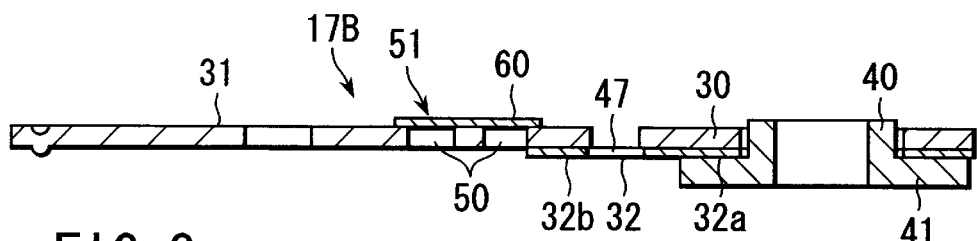
FIG. 8 is a sectional view taken along line F8—F8 of FIG. 7.

FIGS. 7 and 8 show a suspension 17B according to a third embodiment of the invention. A cover portion 51 of the suspension 17B is composed of a laminar member 60 in the form of a plastic tape or metallic foil. The member 60 is attached to a beam portion 31 by means of, for example, an adhesive agent so as to close the respective openings of holes 50. The suspension 17B of the third embodiment has other basic configurations, functions, and effects in common with the suspension 17 of the first embodiment. Therefore, like reference numerals are used to designate common portions of the two embodiments, and a description of those portions is omitted.

Figure 9:
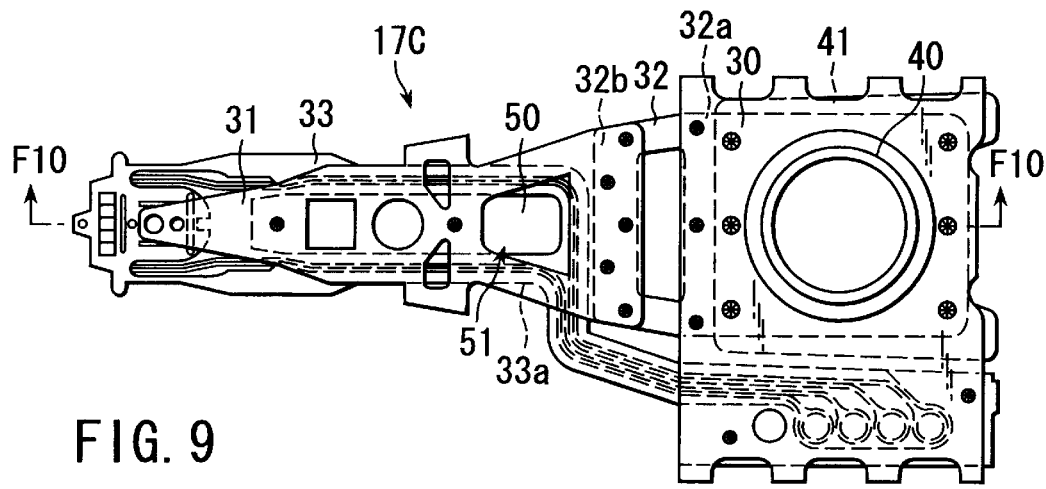
FIG. 9 is a plan view of a suspension according to a fourth embodiment of the invention.
Figure 10:
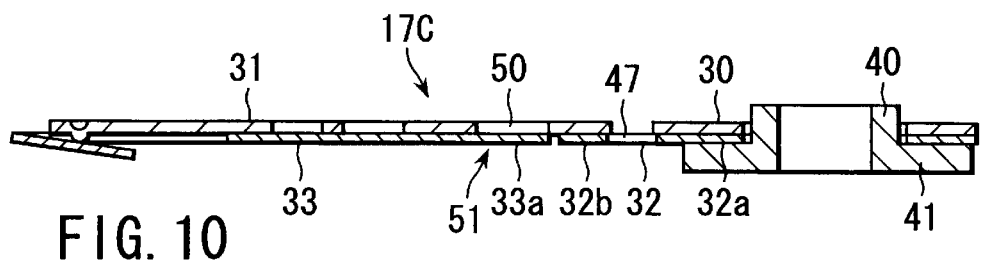
FIG. 10 is a sectional view taken along line F10—F10 of FIG. 9.

Alternatively, the cover portion 51 may be designed so that a part 33a of a flexure 33 (wired flexure in this case) extends to the position of the holes 50, as in the case of a suspension 17C according to a fourth embodiment shown in FIGS. 9 and 10. The cover portions 51 described in connection with these embodiments may be provided on only one side of the beam portion or on both sides, obverse and reverse.

It is to be understood, in carrying out the present invention including the embodiments described herein, that the components of the suspension, including the base portion, beam portion, flexure, hinge member, holes of the beam portion, cover portion, etc., may be variously changed or modified without departing from the scope or spirit of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A suspension for disc drive, comprising:
   a base portion;
   a beam portion with a flexure;
   a hinge member being a separate body from the base portion, the beam portion and the flexure, the hinge member connecting the base portion and the beam portion to each other, an end of the hinge member being fixed to an end portion of the base portion in an overlapping manner, and another end of the hinge member being fixed to an end portion of the beam portion in an overlapping manner;
   a plurality of holes in the beam portion; and
   a cover portion comprising a part of the flexure and being placed on a surface of the beam portion on which the hinge member is fixed, the cover portion covering the entire opening of at least a hole among the holes which are located nearest to the hinge member to restrain a region near the hinge member from being influenced by air turbulence when a disc is rotated.

2. A suspension for disc drive according to claim 1, wherein said cover portion is composed of a part of the flexure.

3. A suspension for disc drive, comprising;
   a base portion;
   a beam portion with a flexure;
   a hinge member being a separate body from the base portion, the beam portion and the flexure, the hinge member connecting the base portion and the beam portion to each other, an end of the hinge member being fixed to an end portion of the base portion in an overlapping manner, and another end of the hinge member being fixed to an end portion of the beam portion in an overlapping manner;
   a hole formed in a region of the beam portion near the hinge member so that the stiffness of the region near the hinge member is lowered; and
   a cover portion comprising a part of the flexure and being placed on a surface of the beam portion on which the hinge member is fixed, the cover portion covering the entire opening of the hole to restrain a region near the hinge member from being influenced by air turbulence when a disc is rotated.

4. A suspension for disc drive according to claim 3, wherein said cover portion is composed of a part of the flexure.

* * * * *